Patented Apr. 20, 1954

2,676,144

UNITED STATES PATENT OFFICE 2,676,144

PROCESS FOR DESALTING LIQUIDS CONTAMINATED WITH IONIZABLE SUBSTANCES CONTAINING CHLORIDES

Sybrandus Gerhardus Wiechers, Pretoria, Union of South Africa, and Cornelis van Hoek, Wassenaar, Netherlands, assignors to Nederlandse Centrale Organisatie Voor Toegepast-Natuurwetenschappelijk Onderzoek, The Hague, Netherlands No Drawing. Application February 1, 1951, Serial No. 208,974

Claims priority, application Netherlands February 7, 1950

7 Claims. (Cl. 204—137)

The invention relates to a process for desalting liquids containing chlorine ions, such as lactose syrup, molasses, whey, milk and the like, by means of electrodialysis in a three chamber apparatus. The invention here disclosed and claimed is related to and makes use of subjects matter disclosed and claimed in copending U. S. patent applications Serial No. 41,390, filed July 29, 1948, and Serial No. 154,096 filed April 5, 1950.

In its most simple design a three-chamber electrodialysis apparatus consists of a chamber in which the anode is placed, separated by a diaphragm from the middle chamber to contain the liquid to be dialyzed, which in turn is separated by a second diaphragm from the chamber in which the cathode is placed.

The anode and cathode chambers are rinsed with liquids into which ions penetrate from the middle chamber by transport by the electric current.

In apparatus for practice on a commercial scale usually no stationary liquids are used, but the rinsing liquids as well as the solution to be dialyzed are flowed continuously through the several chambers, as in this way the current density can be increased considerably without an excessive heating by the electric current. These liquids, particularly the rinsing liquids, are often after cooling in total or in part recycled into the apparatus, thus using for these rinsing liquids substantially closed circuits by which only slight fresh quantities of rinsing liquids are required.

In known apparatus the membranes, having in themselves only a limited mechanical strength, are usually supported by a fabric of cloth, cotton, or the like.

If the solutions to be dialyzed contain chlorides, chlorine is formed at the anode during the passage of the current. In particular with a recycling anode rinsing liquid the concentration of chlorine in this liquid increases rapidly.

As is known, chlorine has a corroding action and consequently the choice of the anode material is limited. Until now certain graphite electrodes or also magnetite electrodes are used to this purpose.

Graphite electrodes proved to have the objection to be attacked nevertheless, moreover this attack is very irregular, and consequently the lifetime of the graphite electrodes can not be predicted. It is likely that this is a result of the fact that up to now nobody succeeded in manufacturing graphite electrodes of a fully constant quality.

The present invention relates to an arrangement by which magnetite is used as anodic material. Magnetite has a great durability to chlorine. Nevertheless in the electrodialysing process making use of magnetite anodes it proved to be necessary to remove the free chlorine in order to avoid the attack of chlorine on other parts of the apparatus, in particular the deterioration of its membranes and supporting members. Moreover the metals such as iron and bronze, occurring in the circuit, are heavily attacked.

It has now been found that the electrodialyzing process can be applied to chloride-containing liquids with long continued efficiency of operation by making use of magnetite anodes and removing chlorine formed at the anodes by the addition of sulphite ions to the anolyte or anode rinsing liquid. Surprisingly, a considerable attack on the magnetite anode takes place when the addition of sulphite ions removes all of the chlorine formed at the anode, even though the anode is substantially unattacked when no sulphite is added.

It was discovered, however, that this attack failed to appear if care was taken that a very little quantity of free chlorine stayed in the recycling anode liquid, viz. exactly so much that a potassium iodide-starch indicator paper still had a blue colour. A chlorine content of 10 mg. free chlorine per litre of liquid proved to be very advantageous to avoid an attack of the magnetite electrodes, whereas no attack on the membranes and the supporting members was perceptible in these circumstances. Even appreciably higher concentrations of some hundreds of mgs. per litre have little influence on the membranes and the other parts of the arrangement, if the supporting members used for the membranes consist of a fabric which is stable to chlorine in this concentration, such as glass fibre cloth or a fabric of polyvinylchloride. The sulphite ions may be supplied by making use of an aqueous sulphurous acid solution; preferably they are supplied by adding to the anode rinsing liquid sodium sulphite, which ionizes to form such a solution and reacts with chlorine to form sodium sulphate and hydrochloric acid. Often a certain concentration of metal ions and a certain concentration of hydrogen ions in the rinsing liquid is preferred. The forming of the final products of this chlorine compound can be taken into consideration in the addition of electrolyte to the rinsing liquid.

Example I

A three chamber apparatus of the kind of the copending U. S. application filed on April 5, 1950, under Serial No. 154,096 was used with an anode membrane having a surface of 3000 cm.$^2$. The dialysed liquid was concentrated whey having a solids contents of 45% and a chlorine content of 1.3%, this chlorine being in the form of chlorides. The three circuits were:

a. The anode rinsing liquid circuit comprising the space between the magnetite anode and the anode membrane and an expansion vessel with an overflow. Through this circuit was circulated a rinsing liquid in a quantity of 2000 litres/hour. The volume of this circuit was 5½ litres. To this circulating liquid about 40 litres/hour of liquid was supplied through a flow-meter, this liquid having a $Na_2SO_4$ content of 0.05 N to control the pH according to the copending U. S. application filed on July 29, 1948, Serial No. 41,390. The excess of rinsing liquid was discharged by the overflow of the expansion vessel.

b. The dialysed liquid circuit comprising the middle chamber of the apparatus, a cooler and an expansion vessel. Through this circuit a quantity of 4000 litres/hour was circulated. The volume of this circuit was 12 litres at the start and 13 litres after 2 hours.

c. The cathode rinsing liquid circuit comprising the space between the iron cathode and the cathode membrane, a cooler and an expansion vessel with an overflow. The quantity of supplied fresh rinsing liquid was 50 litres/hour. This supplied liquid consisted of tap water. Through this circuit 2000 litres/hour of liquid were circulated.

At the start the voltage was 25 volts; after 2 hours this voltage was 40 volts. The current strength being substantially continuously 600 amperes. The average chlorine content of the anode rinsing liquid was 2 grams/litre during the first hour which dropped to 0.3 gram/litre after 2 hours.

The magnetite electrode was not attacked during this process but the cotton support of the anode membrane was attacked after some hours in such a way that its purpose, viz. to avoid the sagging of the membrane, could not be performed and cracks appeared.

Moreover the metal of the circuit, in which bronze as well as iron was present, was heavily corroded.

When, however, during this time so much of a saturated solution of $Na_2SO_3$ was continuously added that potassium iodide starch indicator paper just assumed a blue colour from the outflowing rinsing liquid (during which in total 350 grams $Na_2SO_3.7H_2O$ was added as a saturated solution), it proved that at the end of this period the chlorine content of the rinsing liquid was only 10 mgs. per liter. With this concentration still no appreciable attack of the cotton support took place after 100 working hours, and also no corrosion of the metal could be observed.

Example II

Example I was followed but instead of cotton supports glass fibre cloth supports were used for the membranes. In this case it was not necessary to control the free chlorine content of the circuit anode liquid as accurately as in Example I; it proved to be sufficient to add in total not more than 300 grams $Na_2SO_3.7H_2O$ in maintaining the free chlorine content at 200 milligrams/litre. At this concentration the attack of the membrane and metal of the circuit was not troublesome and during a long period the process could be continued. The advantage of the processing according to this example is that in practice the addition of a precisely correct dosaged quantity of sulphite may sometimes induce difficulties as it is not possible to determine previously the correct quantities of sulphite to be added and according to the method of Example II the tolerance is a little greater and less controlling measures are required.

Example III

In an apparatus of the same kind as that of Example I, having a membrane surface measured on one side of 3000 cm.$^2$, 5 kg. of cane sugar molasses was dialysed with a current of 250 amperes. This molasses had a solids content of 67% and an ash content of 7.9% at the start. Through the anode and cathode circuit 600 litres and through the dialysed liquid circuit 2000 litres of liquid were circulated per hour. The voltage was 12 volts at the start. After 1 hour the voltage was 15 volts after which the quantity of the dialysed liquid was 6.4 kg. of which solids content was 40% and the ash content 2.0%.

The total volume of the anode as well as the cathode rinsing liquid was 4 litres each. To the anode circuit 16 litres of tap water with 4 litres 0.5 N $Na_2SO_4$ per hour were supplied; consequently about 20 litres per hour of rinsing liquid were extracted by the overflow.

Without an addition of $SO_3''$ ion-forming substances the anode rinsing liquid had an average active chlorine content of 300 milligrams/litre (varying from 500 milligrams/litre 15 minutes after the start to 50 milligrams/litre after one hour). According to the invention $SO_2$-containing water was supplied in a repeated process in such a quantity that the free chlorine content remained substantially 20 milligrams/litre. In total 5.0 grams $SO_2$ were used. No attack of the metals of the circuit or of the polyvinyl supports of the membranes was observed.

To the cathode rinsing liquid 20 litres of 0.02 N NaOH per hour were supplied.

We claim:

1. A process for desalting a liquid containing ionizing substances including a chloride, which comprises, while subjecting a body of said liquid confined between spaced diaphragms to a difference of electric potential between a magnetite anode and a cathode immersed, respectively, in an aqueous anolyte and an aqueous catholyte at respective other sides of said diaphragms, whereby anions are removed from the liquid into the anolyte and chlorine is formed at the anode, continually adding to the anolyte a compound that forms sulphite ions in a quantity sufficient to react with a substantial part of but less than stoichiometric in relation to the quantity of chlorine formed at the anode, thereby avoiding corrosion by such chlorine.

2. A process for desalting a liquid containing ionizing substances including a chloride, which comprises, while subjecting a body of said liquid confined between spaced diaphragms to a difference of electric potential between a magnetite anode and a cathode immersed, respectively, in an aqueous anolyte and an aqueous catholyte at respective other sides of said diaphragms, whereby anions are removed from the liquid into anolyte and chlorine is formed at the anode, continually adding to the anolyte a compound that forms sulphite ions in a quantity less than stoichiometric in relation to the quantity of chlorine formed at the anode but sufficient to prevent the chlorine content of the anolyte from exceeding about .2 gram per litre, thereby avoiding corrosion by such chlorine.

3. A process for desalting a liquid containing ionizing substances including a chloride, which comprises, while subjecting a body of said liquid confined between spaced diaphragms to a difference of electric potential between a magnetite anode and a cathode immersed, respectively, in an aqueous anolyte and an aqueous catholyte at respective other sides of said diaphragms, whereby anions are removed from the liquid into the anolyte and chlorine is formed at the anode, continually adding to the anolyte a compound that forms sulphite ions in a quantity less than stoichiometric in relation to the quantity of chlorine formed at the anode but sufficient to prevent chlorine content of the anolyte from exceeding about .01 gram per litre, thereby avoiding corrosion by such chlorine.

4. A process for desalting a liquid containing ionizing substances including a chloride, which comprises, while subjecting a body of said liquid confined between spaced diaphragms to a difference of electric potential between a magnetite anode and a cathode immersed, respectively, in an aqueous anolyte and an aqueous catholyte at respective other sides of said diaphragms, whereby anions are removed from the liquid into the anolyte and chlorine is formed at the anode, continuously flowing an aqueous anode rinsing liquid into and from the anolyte, and supplying in the inflowing rinsing liquid a quantity of a compound that forms sulphite ions sufficient to react with a substantial part of but less than stoichiometric in relation to the quantity of chlorine formed at the anode, thereby avoiding corrosion by such chlorine.

5. A process for desalting a liquid containing ionizing substances including a chloride, which comprises, while subjecting a body of said liquid confined between spaced diaphragms to a difference of electric potential between a magnetite anode and a cathode immersed, respectively, in an aqueous anolyte and an aqueous catholyte at respective other sides of said diaphragms, whereby anions are removed from the liquid into the anolyte and chlorine is formed at the anode, continuously flowing an aqueous anode rinsing liquid into and from the anolyte, and supplying a compound that forms sulphite ions in the inflowing rinsing liquid in a quantity to react with such a fractional part of the chlorine formed at the anode that the effluent rinsing liquid continually gives a blue color to a potassium iodide-starch indicator, thereby avoiding corrosion by such chlorine.

6. A process for desalting a liquid containing ionizing substances including a chloride, which comprises, while subjecting a body of said liquid confined between spaced diaphragms to a difference of electric potential between a magnetite anode and a cathode immersed, respectively, in an aqueous anolyte and an aqueous catholyte at respective other sides of said diaphragms, whereby anions are removed from the liquid into the anolyte and chlorine is formed at the anode, continuously flowing into the anolyte an aqueous alkali metal sulphite solution at a rate and concentration at which a substantial part but not all of the chlorine formed at the anode reacts with the inflowing sulphite ions, thereby maintaining a limited quantity of free chlorine in the anolyte and in liquid flowing therefrom yet avoiding corrosion by action of the formed chlorine.

7. A process for desalting a liquid containing ionizing substances including a chloride, which comprises, while subjecting a body of said liquid confined between spaced diaphragms to a difference of electric potential between a magnetite anode and a cathode immersed, respectively, in an aqueous anolyte and an aqueous catholyte at respective other sides of said diaphragms, whereby anions are removed from the liquid into the anolyte and chlorine is formed at the anode, continuously flowing into the anolyte an aqueous sulfurous acid solution at a rate and concentration at which a substantial part but not all of the chlorine formed at the anode reacts with the inflowing sulphite ions, thereby maintaining a limited quantity of free chlorine in the anolyte and in liquid flowing therefrom yet avoiding corrosion by action of the formed chlorine.

References Cited in the file of this patent

UNITED STATES PATENTS

| Number | Name | Date |
| --- | --- | --- |
| 2,093,770 | Billiter | Sept. 21, 1937 |

FOREIGN PATENTS

| Number | Country | Date |
| --- | --- | --- |
| 106,246 | Australia | Jan. 12, 1939 |